(12) United States Patent
Okuda (10) Patent No.: US 8,483,556 B2
(45) Date of Patent: Jul. 9, 2013

(54) IMAGING UNIT

(75) Inventor: Isao Okuda, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/239,930

(22) Filed: Sep. 22, 2011

(65) Prior Publication Data

US 2012/0076479 A1 Mar. 29, 2012

(30) Foreign Application Priority Data

Sep. 29, 2010 (JP) .................... 2010-219530
Oct. 13, 2010 (JP) .................... 2010-230839
Oct. 15, 2010 (JP) .................... 2010-232558
Feb. 3, 2011 (JP) .................... 2011-021974

(51) Int. Cl.
   *G03B 17/00* (2006.01)
(52) U.S. Cl.
   USPC .......................................... 396/79
(58) Field of Classification Search
   USPC .................................. 396/79; 348/337
   See application file for complete search history.

(56) References Cited

U.S. PATENT DOCUMENTS

| | | | |
|---|---|---|---|
| 5,392,160 A * | 2/1995 | Satoh et al. ........... | 359/695 |
| 6,762,888 B1 * | 7/2004 | Oshima .................. | 359/696 |
| 2007/0024739 A1 * | 2/2007 | Konno .................. | 348/337 |
| 2008/0291543 A1 | 11/2008 | Nomura et al. | |

FOREIGN PATENT DOCUMENTS

| | | |
|---|---|---|
| JP | 2003-057721 | 2/2003 |
| JP | 2005-351932 | 12/2005 |
| JP | 2007-033819 | 2/2007 |
| JP | 2008-242446 | 10/2008 |
| JP | 2010-014786 | 1/2010 |

OTHER PUBLICATIONS

U.S. Appl. No. 12/036,459 to Hiroshi Nomura et al., filed Feb. 25, 2008.
U.S. Appl. No. 13/239,909 to Isao Okuda, filed Sep. 22, 2011.
U.S. Appl. No. 13/231,087 to Isao Okuda, filed Sep. 13, 2011.
U.S. Appl. No. 13/239,895 to Isao Okuda, filed Sep. 22, 2011.

* cited by examiner

*Primary Examiner* — Clayton E Laballe
*Assistant Examiner* — Noam Reisner
(74) *Attorney, Agent, or Firm* — Greenblum & Bernstein, P.L.C.

(57) ABSTRACT

An imaging unit includes an incident-side reflecting surface provided in a casing and reflects object-emanating light, entering the casing in a thickness direction thereof, along a lengthwise direction of the casing; a movable lens group movable along the lengthwise direction of the casing; an exit-side reflecting surface reflecting the light in the thickness direction of the casing; an image sensor provided in the casing and receiving the light from the exit-side reflecting surface; a light shield frame between the movable lens group and the exit-side reflecting surface; and a light-shield-frame position adjustment mechanism provided in the casing, which maintains a constant distance between the movable lens group an the light shield frame when the movable lens group moves in a first moving range, and varies the distance between the movable lens group and the light shield frame when the movable lens group moves in a second moving range.

8 Claims, 9 Drawing Sheets

IMAGING UNIT

BACKGROUND OF THE INVENTION

1. Field of the Invention

The present invention relates to an imaging unit having an imaging optical system and an image sensor that captures light emanating from a photographic object which is passed through the imaging optical system. The imaging optical system and the image sensor are accommodated in a housing of the imaging unit.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to have the capability of taking such photographic images as a subsidiary function, such as mobile phones equipped with a camera and personal digital assistants (PDAs) equipped with a camera, have become widespread. In these types of mobile electronic devices, it is common to provide the mobile electronic device therein with an imaging unit which is structured such that an image sensor and a photographing optical system for leading light emanating from a photographic object (object to be photographed) to the image sensor are accommodated in a hollow housing of the imaging unit. Additionally, in recent years, the downsizing (slimming down) of the mobile electronic devices has further progressed, so that the demand to also slim down the imaging unit has become stronger.

Japanese Unexamined Patent Publication No. 2008-242446 discloses an example of a conventional imaging unit. This imaging unit is provided with a hollow casing and is further provided in this casing with an imaging optical system and an image sensor. The imaging optical system is provided with an incident-side prism, an exit-side prism and movable lens groups that serve as power-varying lens groups. The incident-side prism and the exit-side prism are installed to be spaced from each other in the lengthwise direction of the casing, and the movable lens groups are positioned between the incident-side prism and the exit-side prism and move forward and rearward along the lengthwise direction of the casing. The traveling direction of light which emanates from a photographic object to be incident on the incident-side prism (which serves as an incident portion of the imaging optical system) changes (i.e., is reflected) at an angle of 90 degrees by the incident-side prism, and thereafter passes through the aforementioned movable lens groups to be incident on the exit-side prism. Thereupon, the traveling direction of the light incident on the exit-side prism again changes (i.e., is reflected) at an angle of 90 degrees by the exit-side prism to be received (captured) by the imaging surface (photosensitive surface) of the image sensor.

Configuring the imaging optical system using two prisms in such a manner makes it possible to guide light emanating from a photographic object to an image sensor while achieving a reduction in the size of the casing in the direction of the thickness thereof (in a direction orthogonal to the lengthwise direction of the casing).

In optical apparatuses, it is often the case that stray light becomes incident on an imaging surface (image-forming surface) from different directions from a normal optical path. If stray light is incident on the imaging surface, a ghost image occurs in the captured (photographed) image, and hence, a light shield frame for shielding stray light traveling toward the imaging surface is often installed. Specifically, in the imaging unit the casing of which is slimmed down as described above, the distance between the inner wall of the casing and the imaging optical system is small, which increases the possibility of stray light which is reflected by the inner wall of the casing or reflected a side of the exit-side prism being directly incident on the imaging surface, and accordingly, the installation of the aforementioned light shield frame is effective in preventing stray light from being incident on the imaging surface.

In general, such a light shield frame is fixed to a movable lens frame which supports a movable lens group (for instance, see Japanese Unexamined Patent Publications Nos. 2003-57721 and 2010-14786).

However, if the light shield frame is fixed to such a movable lens frame, the distance between the light shield frame and the movable lens group in the optical axis direction is constant even if the position of the movable lens group in the optical axis direction is changed, which makes it difficult to locate the light shield frame at an optimum position (for shielding stray light) at each focal length. In addition, the same problem arises also in the case where the light shield frame is supported to be slightly movable relative to the movable lens frame.

SUMMARY OF THE INVENTION

The present invention provides an imaging unit having a structure which enables the light shield frame to be located at an optimum position so that the light shield frame can shield stray light wherever the associated movable lens group (power-varying lens group) is positioned, even though the entire imaging unit is slim.

According to an aspect of the present invention, an imaging unit is provided, including an incident-side reflecting surface which is provided in a casing and reflects light, emanating from an object and entering the casing from the outside thereof in a direction of thickness of the casing, so that the light reflected by the incident-side reflecting surface travels along a lengthwise direction of the casing that is orthogonal to the direction of thickness of the casing; a movable lens group which is provided in the casing as a power-varying lens group and allows the light, which is reflected by the incident-side reflecting surface, to pass through the movable lens group, the movable lens group being movable along the lengthwise direction of the casing; an exit-side reflecting surface which is provided in the casing and reflects the light, which is incident on the exit-side reflecting surface after passing through the movable lens group, so that the light travels from the exit-side reflecting surface and in the direction of thickness of the casing; an image sensor which is provided in the casing and receives the light that has traveled from the exit-side reflecting surface; a light shield frame provided in the casing between the movable lens group and the exit-side reflecting surface; and a light-shield-frame position adjustment mechanism which is provided in the casing, maintains a constant distance between the movable lens group an the light shield frame when the movable lens group moves in a first moving range, and varies the distance between the movable lens group and the light shield frame when the movable lens group moves in a second moving range.

It is desirable for the light-shield-frame position adjustment mechanism to include a rod which is fixed to the casing and positioned therein, extends in the lengthwise direction of the casing and prevents the light shield frame from rotating; a movable lens frame which supports the movable lens group and is supported by the rod to be slidable thereon; and a guide bar which is fixed to the movable lens frame to extend parallel to the rod and supports the light shield frame in a manner to allow the light shield frame to move on the guide bar in a direction of an axis of the guide bar.

It is desirable for the light-shield-frame position adjustment mechanism to include a stopper which is provided on the guide bar on an opposite side of the light shield frame with respect to the movable lens frame, the stopper comes into contact with the light shield frame to prevent the light shield frame from moving further in a direction away from the movable lens frame when the light shield frame moves from the movable lens frame side; and a biaser which provides a biasing force so as to move the light shield frame toward the stopper.

It is desirable for the light-shield-frame position adjustment mechanism to include a light shield frame position limit portion provided in the casing. When the movable lens group moves in one direction in the second moving range, the light shield frame position limit portion comes into contact with the light shield frame to prevent the light shield frame from moving further in the one direction relative to the guide bar.

When the movable lens group moves in one direction in the second moving range, it is desirable for the light-shield-frame position adjustment mechanism to prevent the light shield frame from moving further in the one direction relative to the guide bar beyond a predetermined point while allowing the movable lens group to continue moving in the one direction by a predetermined amount of movement so as to reduce the distance between the movable lens group and the light shield frame.

It is desirable for the biaser to be a spring.

The imaging unit according to the present invention is structured such that stray light easily occurs (tolerate light which emanates from a photographic object being easily reflected by the inner wall of the casing) because the imaging unit (casing) is slimmed down by configuring the imaging optical system, which is for leading light emanating from a photographic object to the image sensor, using two reflecting surfaces (the incident-side surface and the exit-side surface).

However, since the distance between the light shield frame and the movable lens group is maintained constant when the movable lens group moves in the first moving range (when the focal length of the imaging optical system is in a predetermined focal length range), and this distance between the light shield frame and the movable lens group is varied when the movable lens group moves in the second moving range (when the focal length of the imaging optical system is in another focal length range), it is possible to locate the light shield frame at an optimum position for shielding stray light regardless of which focal length the imaging optical system is set. Accordingly, it is possible to effectively prevent ghost images from occurring in captured images even though the imaging unit is structured such that stray light easily occurs.

The present disclosure relates to subject matter contained in Japanese Patent Applications Nos. 2010-219530 (filed on Sep. 29, 2010), 2010-230839 (filed on Oct. 13, 2010), 2010-232558 (filed on Oct. 15, 2010) and 2011-021974 (filed on Feb. 3, 2011) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

In the following descriptions, forward and rearward directions, leftward and rightward directions, and upward and downward directions are determined with reference to the directions of the double-headed arrows shown in the drawings.

Figure 1:
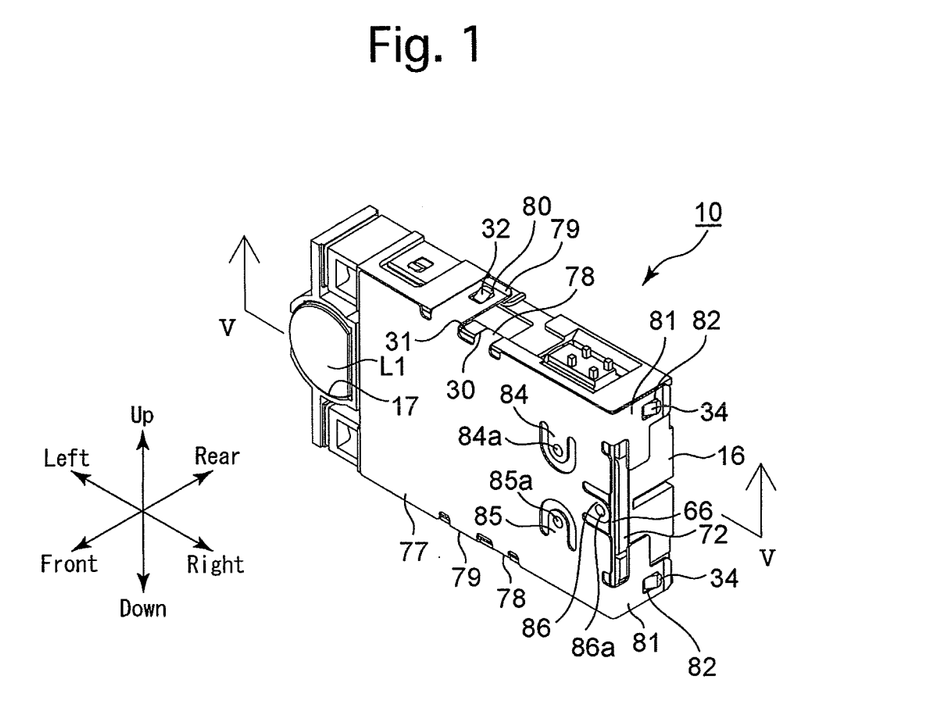
FIG. 1 is a front perspective view of an embodiment of an imaging unit according to the present invention, viewed obliquely from above.
Figure 2:
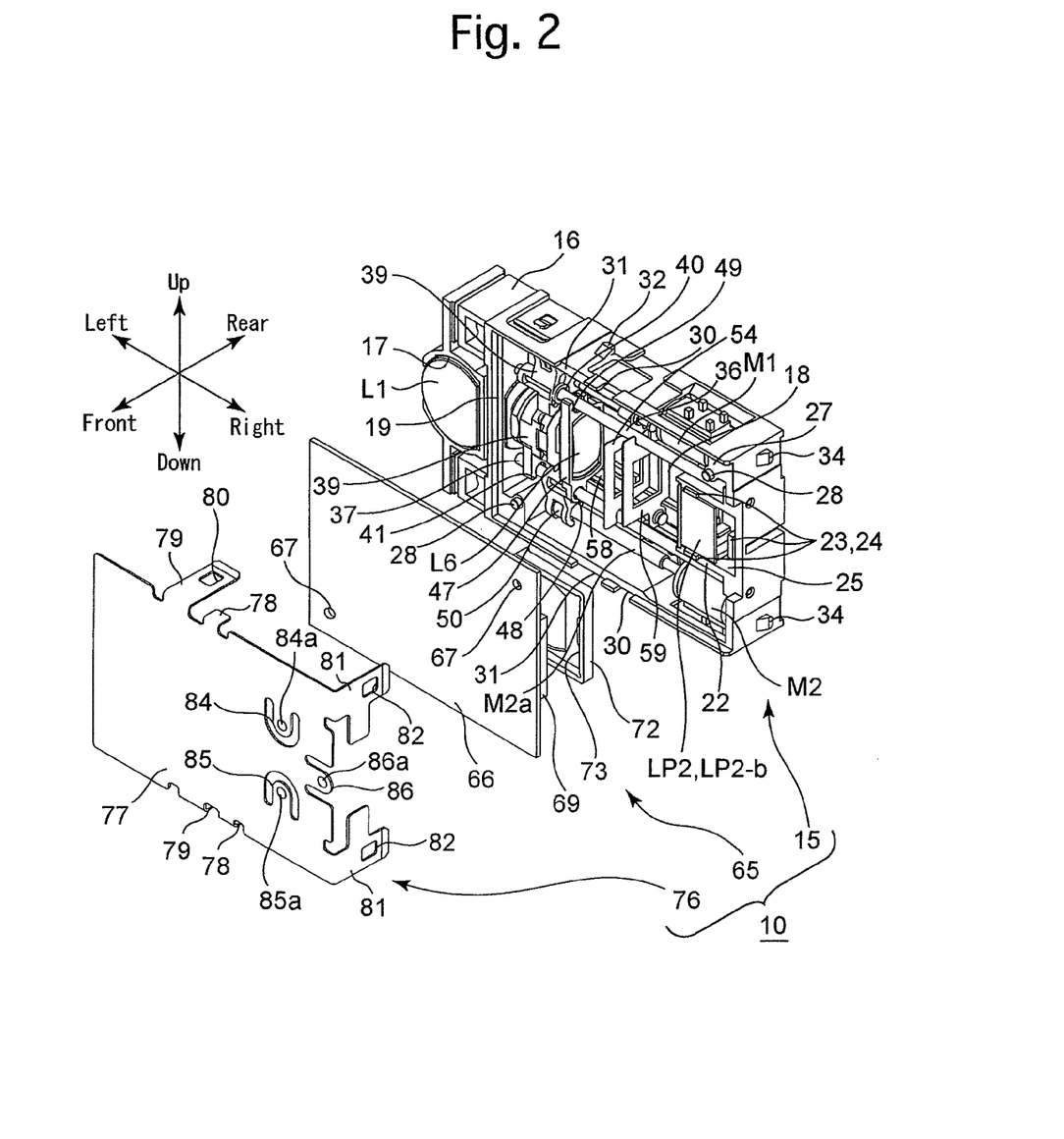
FIG. 2 is a front exploded perspective view of the imaging unit, viewed obliquely from above.
Figure 3:
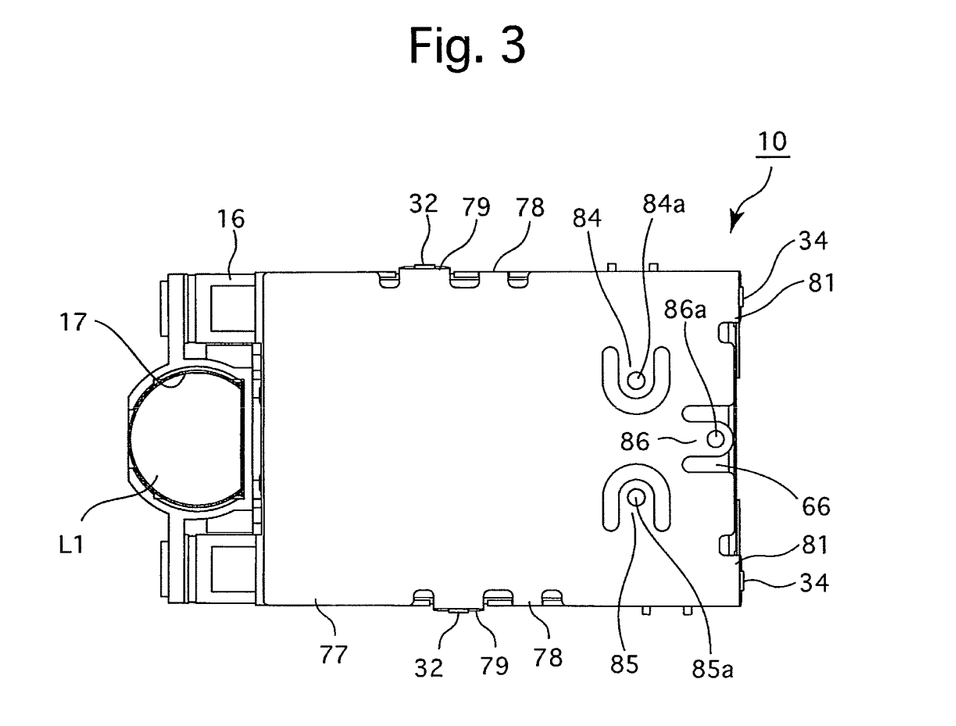
FIG. 3 is a front elevational view of the imaging unit.

As shown in FIGS. 1 and 2, the imaging unit 10 is provided with a body module 15, a board module 65 and a cover 76 constitute the major components of the imaging unit 10.

The body module 15 is provided with a housing (casing) 16 made of synthetic resin. The housing 16 is provided at the front left end thereof with a mounting recess 17 formed into the shape of a letter D in cross section. In addition, the housing 16 is provided, on the front thereof except this front left end (on the substantially entire front part of the housing 16), with a substantially rectangular accommodating recess (opening) 18. The housing 16 is provided between the mounting recess 17 and the accommodating recess 18 with a partition wall 19. The housing 16 is provided at a center of the partition wall 19 with a communication hole (through-hole) 20 (see FIGS. 4 through 6) via which the mounting recess 17 and the accommodating recess 18 are communicatively connected with each other. The housing 16 is provided, in the accommodating recess 18 at the right end thereof, with a positioning portion 22 having a substantially rectangular shape, in a front view, which projects forward from the base of the accommodating recess 18 (i.e., from a front surface of the base surface in the accommodating recess 18). The positioning portion 22 is provided with three positioning projections 23 (spacers) which project forward, and the front end surfaces of the three positioning projections 23 are formed as flat positioning surfaces 24 which lie in a common plane orthogonal to the forward/rearward direction (i.e., the direction of the thickness of the housing 16). In addition, the housing 16 is provided in the positioning portion 22 with a prism mounting recess 25 which is open at the front and left sides. The positioning portion 22 is provided on the left side thereof with a pair of (upper and lower) limit projections (light shield frame position limit portions) 26 which project leftward (see FIG. 6), and the left end surface of the pair of limit projections 26 are formed as light shield frame position limit surfaces 26*a* which are flat surfaces lying in a common plane orthogonal to the leftward/rightward direction (i.e., in a common plane orthogonal to the longitudinal direction of the housing 16). The housing 16 is provided, around the front edge of the inner peripheral surface of the accommodating recess 18, with a board support surface 27 which is positioned behind the frontmost end of the housing 16 and lies in a plane orthogonal to the forward/rearward direction, and is further provided on the board support surface 27 with two lock projections 28 which project forward from the board support surface 27. The housing 16 is provided, at the front end of the center of the upper surface of the housing 16, with a first engaging recess 30 which is recessed downward from the upper surface (periphery) of the housing 16. The housing 16 is also provided, at the front end of the upper surface of the housing 16 on the left-hand side of the first engaging recess 30, with a second engaging recess 31 which is recessed downward from the upper surface (periphery) of the housing 16 by the same amount as the first engaging recess 30 and is wider than the first engaging recess 30. The housing 16 is provided in the second engaging recess 31 with an engaging projection 32. The housing 16 is also provided on the lower surface thereof with a first engaging recess 30, a second engaging recess 31 and an engaging projection 32 which have the same configurations as those provided on the upper surface of the housing 16. The positional relationship between the first engaging recess 30, the second engaging recess 31 and the engaging projection 32 which are formed on the lower surface of housing 16 is identical to the positional relationship between the first engaging recess 30, the second engaging recess 31 and the engaging projection 32 which are formed on the upper surface of housing 16; however, the positions of the first engaging recess 30, the second engaging recess 31 and the engaging projection 32 which are formed on the lower surface of the housing 16 in the leftward/rightward direction are all shifted to the right with respect to those formed on the upper surface of the housing 16. Additionally, the housing 16 is provided on the right side thereof with a pair of (upper and lower) engaging projections 34.

Figure 4:
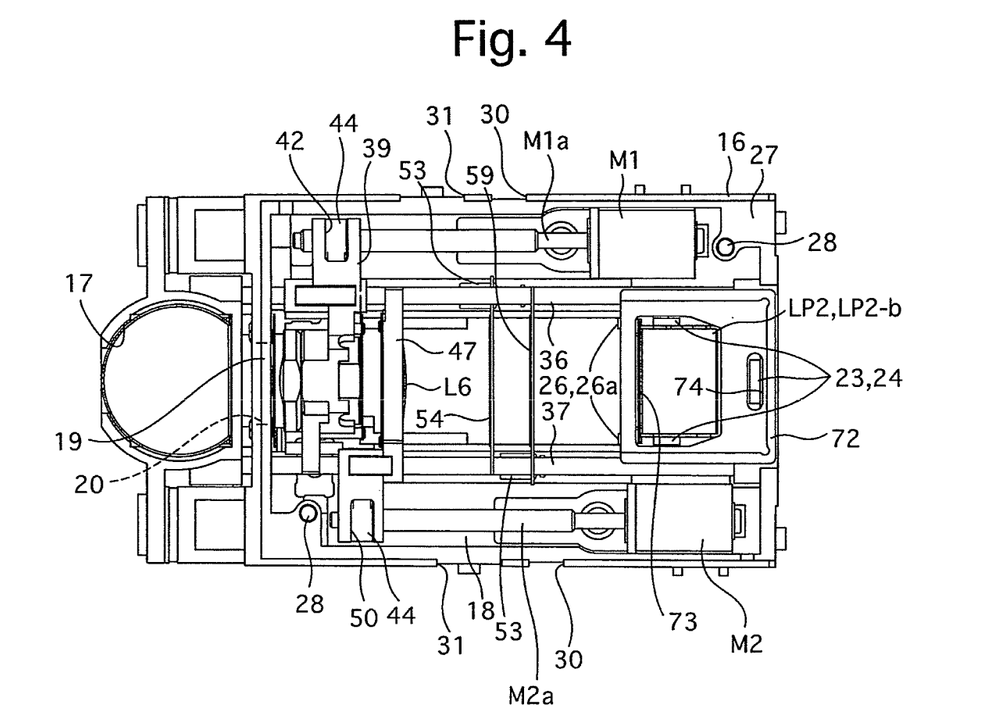
FIG. 4 is a front elevational view of the imaging unit with a cover and a circuit board removed when an imaging optical system is set at the telephoto extremity.
Figure 5:
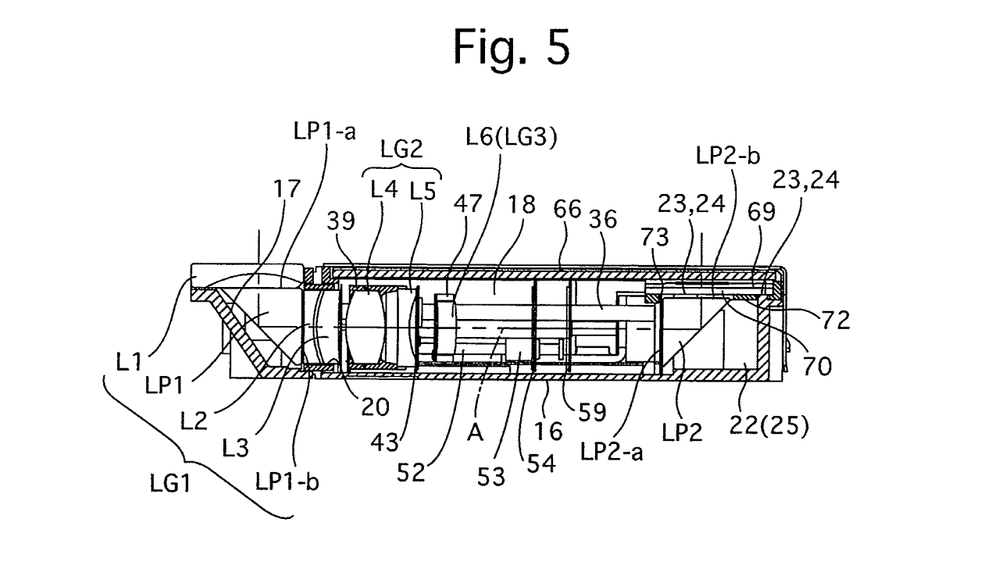
FIG. 5 is a cross sectional view taken along the line V-V shown in FIG. 1 when the imaging optical system is set at the telephoto extremity.
Figure 6:
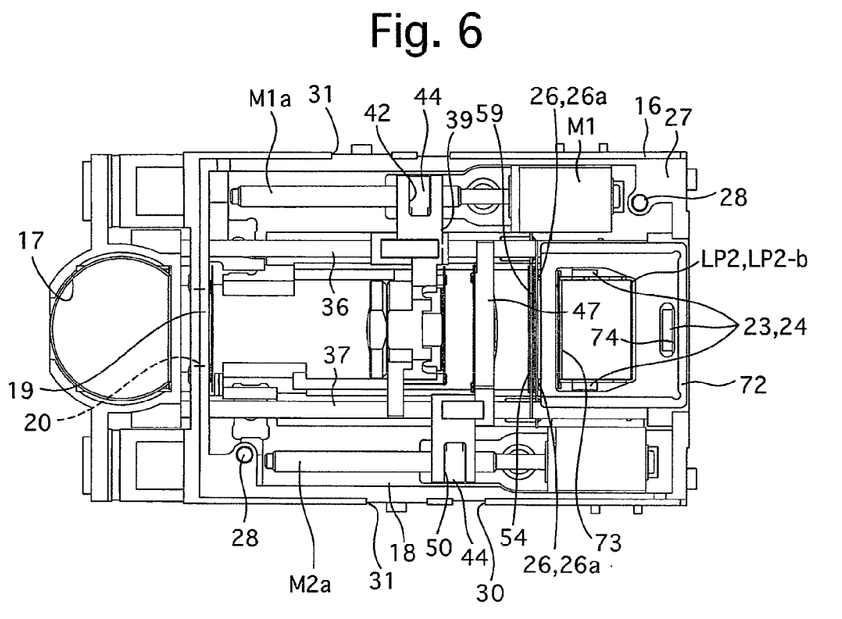
FIG. 6 is a view similar to that of FIG. 4, showing the imaging unit with the cover and the circuit board removed when the imaging optical system is set at the wide-angle extremity.
Figure 7:
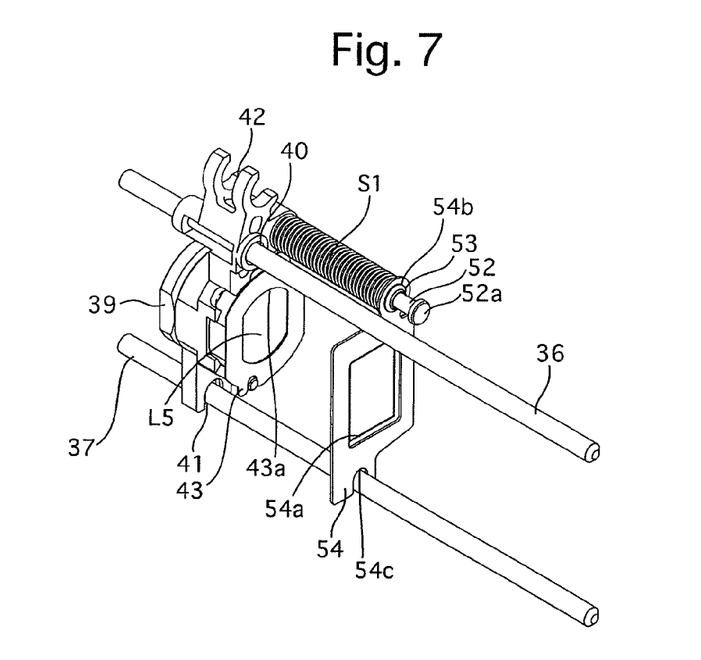
FIG. 7 is a perspective view of a second lens group frame, a first light shield frame and peripheral parts.

As shown in FIGS. 4 through 6, the body module 15 is provided in the mounting recess 17 with a first prism (incident-side prism/incident-side reflecting surface) LP1 that is fit-engaged in the mounting recess 17 and fixed thereto. The first prism LP1 is provided with an incident surface LP1-*a* which is orthogonal to the forward/rearward direction and an exit surface LP1-*b* which is orthogonal to the leftward/rightward direction. The body module 15 is provided with a lens (lens element) L1 which is fitted into the front end of the mounting recess 17 and fixed thereto. The lens L1 is substantially the same in cross sectional shape as the mounting recess 17, and the optical axis of the lens L1 extends in the forward/rearward direction. The front surface of the lens L1 is exposed to the front of the imaging unit 10, and the rear surface of the lens L1 and the incident surface LP1-*a* face each other in the forward/rearward direction. As shown in FIGS. 2 and 5, the body module 15 is provided with two lenses (lens elements) L2 and L3 which are fixedly fitted into the communication hole 20 to face the exit surface LP1-*b* of the first prism LP1 in the leftward/rightward direction. The lens L1, the first prism LP1, the lens L2 and the lens L3 are optical elements of a first lens group LG1 provided in the body module 15.

The body module 15 is provided in the prism mounting recess 25 with a second prism (exit-side prism/exit-side reflecting surface) LP2 that is fit-engaged in the prism mounting recess 25 and fixed thereto. The second prism LP2 has an incident surface LP2-*a* which is orthogonal to the leftward/rightward direction and an exit surface LP2-*b* which is orthogonal to the forward/rearward direction. The incident surface LP2-*a* faces the exit surface LP1-*b* in the leftward/rightward direction.

The body module 15 is provided with a first rod (cylindrical rod) 36 and a second rod (cylindrical rod) 37 which are made of metal and extend linearly in the leftward/rightward direction. The first rod 36 and the second rod 37 are each fixed at both ends thereof to an inner surface of the right side wall of the housing 16 and the partition wall 19 so that the left ends of the first rod 36 and the second rod 37 are aligned in the upward/downward direction and so that the right ends of the first rod 36 and the second rod 37 are aligned in the upward/downward direction.

The body module 15 is provided with a second lens group frame 39 made of synthetic resin. An insertion hole 40 in which the first rod 36 is inserted is formed through the upper part of the second lens group frame 39, and a rotation prevention groove 41 in which the second rod 37 is engaged is formed in the lower end of the second lens group frame 39. The second lens group frame 39 is prevented from rotating about the first rod 36 by the engagement of the rotation prevention groove 41 with the second rod 37, and accordingly, the second lens group frame 39 can slide on and along the first rod 36 and the second rod 37 in the leftward/rightward direction. The body module 15 is provided with a second lens group (movable lens group/first movable lens group) LG2 configured of two lenses (lens elements) L4 and L5 which face the exit surface LP1-*b* of the first prism LP1 and the incident surface LP2-*a* of the second prism LP2 in the leftward/rightward direction, respectively. The second lens group LG2 is fixedly fitted into a lens holding hole which is formed through the second lens group frame 39 in the leftward/rightward direction. A light shielding sheet 43 which is provided at a center thereof with a light-bundle limiting aperture 43*a* is fixed to the right side surface of the second lens group frame 39 so that the center of the light-bundle limiting aperture 43*a* is positioned coaxially with the optical axis of the lenses L4 and L5. In addition, a nut holding hole 42, both ends of which in the leftward/rightward direction are formed as open ends, is formed at the upper end of the second lens group frame 39, and a driven nut (upper driven nut) 44 through which a female screw hole with the axis thereof extending in the leftward/rightward direction is formed is fixedly fitted into the nut holding hole 42 (the end of the nut holding hole 42 at the first rod 36 constitutes a rotation stop for the upper driven nut 44). The body module 15 is provided with a first motor M1 configured of a stepping motor which is fixed to the housing 16 in the upper part of the accommodating recess 18. The first motor M1 is provided with a rotary drive shaft M1*a* which extends linearly leftwards, and a male screw thread formed on the rotary drive shaft M1*a* in the vicinity of the end (left end with respect to FIG. 4) thereof is screw-engaged with the aforementioned female screw hole of the upper driven nut 44. Accordingly, forward and reverse rotations of the rotary drive shaft M1*a* that are caused by forward and reverse rotations of the first motor M1 cause the second lens group frame 39 (the lenses L4 and L5) to move linearly between the telephoto extremity position (shown in FIGS. 4 and 5) and the wide-angle extremity position (shown in FIG. 6) in the leftward/rightward direction along the first rod 36 and the second rod 37.

In addition, the body module 15 is provided with a third lens group frame (second movable lens frame) 47 made of synthetic resin. An insertion hole 48 in which the second rod 37 is inserted is formed through the lower part of the third lens group frame 47, and a rotation prevention groove 49 in which the first rod 36 is engaged is formed in the upper end of the third lens group frame 47. Accordingly, the third lens group frame 47 can slide on and along the first rod 36 and the second rod 37 in the leftward/rightward direction (while being prevented from rotating about the second rod 37). The body module 15 is provided with a third lens group (movable lens group/second movable lens group) LG3 configured of a lens (lens element) L6 and the optical axis thereof is coaxial with the optical axis of the second lens group LG2. The third lens group LG3 is fixedly fitted into a lens holding hole which is formed through the third lens group frame 47 in the leftward/rightward direction. A nut holding hole 50, both ends of which in the leftward/rightward direction are formed as open ends, is formed at the lower end of the third lens group frame 47, and a driven nut (lower driven nut) 44, through which a female screw hole with the axis thereof extending in the leftward/rightward direction is formed, is fixedly fitted into the nut holding hole 50 (the end of the nut holding hole 50 at the second rod 37 constitutes a rotation stop for the lower driven nut 44). The body module 15 is provided with a second motor M2 which is identical in specifications to the first motor M1 and fixed to the housing 16 in the lower part of the accommodating recess 18. The second motor M2 is provided with a rotary drive shaft M2a (identical in specifications to the rotary drive shaft M1a), and a male screw thread formed on the rotary drive shaft M2a in the vicinity of the end (left end with respect to FIG. 4) is screw-engaged with the aforementioned female screw hole of the lower driven nut 44. Therefore, forward and reverse rotations of the rotary drive shaft M2a that are caused by forward and reverse rotations of the second motor M2 cause the third lens group frame 47 (the third lens group L3) to move linearly between the telephoto extremity position (shown in FIGS. 4 and 5) and the wide-angle extremity position (shown in FIG. 6) in the leftward/rightward direction along the first rod 36 and the second rod 37.

The first lens group LG1 (L1, LP1, L2 and L3), the second lens group LG2 (L4 and L5), the third lens group LG3 (L6) and the second prism LP2 that have been described above are optical elements of an imaging optical system (bending optical system). A zooming operation is performed by moving the second lens group LG2 (the lenses L4 and L5) and the third lens group LG3 (the lens L6) along the first rod 36 and the second rod 37, and a focusing operation is performed by moving only the third lens group LG3 along the first rod 36 and the second rod 37.

It should be noted that the housing 16, the first rod 36, the second rod 37, the imaging optical system, the first motor M1 and the second motor M2 are components of the body module 15.

The body module 15 is provided, in the vicinity of the first rod 36 in the accommodating recess 18, with a columnar guide bar (upper guide bar) 52 made of metal which extends parallel to the first rod 36, the second rod 37 and an optical axis A of the lenses L2 through L6. The left end of the guide bar 52 is fixed to the second lens group frame 39 in the vicinity of the upper end thereof. A metal slidable cylinder (upper slidable cylinder) 53 is fitted on the guide bar 52 to be freely slidable thereon. The guide bar 52 is integrally provided at the right end thereof with a stopper 52a that is disk-shaped, the diameter of which is greater than the inner diameter of the slidable cylinder 53. A compression coil spring (biaser) S1 is installed around the first rod 36 and positioned between the second lens group frame 39 and the slidable cylinder 53. The left end and the right end of the compression coil spring S1 are fixed to the second lens group frame 39 and the slidable cylinder 53, respectively. When no external force is applied to the slidable cylinder 53 (when the slidable cylinder 53 is at the telephoto extremity position thereof), the compression coil spring S1 is in a free state in which the slidable cylinder 53 is positioned between the right end of the compression coil spring S1 and the stopper 52a (a space is provided between the slidable cylinder 53 and the stopper 52a).

The body module 15 is provided with a first light shield frame 54 made of a lightproof material, the upper end of which is fixed to the slidable cylinder 53. The first light shield frame 54 is a planar member orthogonal to the axis of the guide bar 52. The first light shield frame 54 is provided at a center thereof with a light-bundle limiting aperture 54a in the shape of a rectangle. The first light shield frame 54 is provided at the upper end thereof with a fixing hole 54b which is fixedly engaged with the slidable cylinder 53, and the first light shield frame 54 is provided at the lower end thereof with a rotation prevention groove 54c in which the second rod 37 is engaged. Movement of the slidable cylinder 53 together with the guide bar 52 and the second lens group frame 39 in the leftward/rightward direction causes the first light shield frame 54 to slide on and along the second rod 37 in the leftward/rightward direction.

Figure 8:
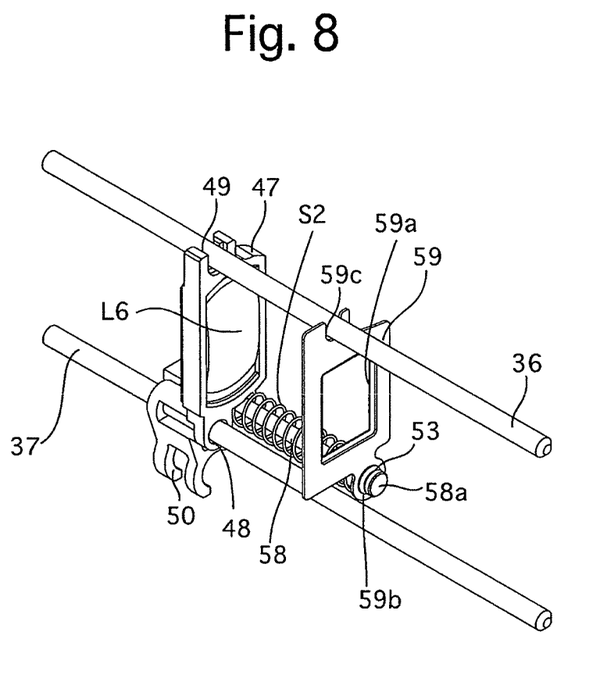
FIG. 8 is a perspective view of a third lens group frame, a second light shield frame and peripheral parts.

The body module 15 is provided, in the vicinity of the second rod 37 in the accommodating recess 18, with a columnar guide bar (lower guide bar) 58 (see FIGS. 1 and 8) which is identical in specifications to the upper guide bar 52 and extends parallel to the guide bar 52. The left end of the guide bar 58 is fixed to the third lens group frame 47 in the vicinity of the lower end thereof. A metal slidable cylinder (lower slidable cylinder) 53 (identical in specifications to the upper slidable cylinder 53) is fitted on the guide bar 58 to be freely slidable thereon. The guide bar 58 is integrally provided at the right end thereof with a stopper 58a that is disk-shaped, the diameter of which is greater than the inner diameter of the lower slidable cylinder 53. A compression coil spring (biaser) S2 is installed on the second rod 37 and positioned between the third lens group frame 47 and the lower slidable cylinder 53 in a compressed state (resiliently deformed state). The compression coil spring S2 provides a biasing force so that the lower slidable cylinder 53 is biased to move rightward, and accordingly, the lower slidable cylinder 53 abuts the stopper 58a when no leftward external force is applied to the lower slidable cylinder 53.

The body module 15 is provided with a second light shield frame 59 which is positioned between the first light shield frame 54 and the second prism LP2 and the lower end of which is fixed to the lower slidable cylinder 53 that is supported by the guide bar 58. The second light shield frame 59 is made of a lightproof material and configured from a planar member orthogonal to the axis of the guide bar 58. The second light shield frame 59 is provided at a center thereof with a light-bundle limiting aperture 59a in the shape of a rectangle. The second light shield frame 59 is provided at the lower end thereof with a fixing hole 59b which is fixedly engaged with the lower slidable cylinder 53, and the second light shield frame 59 is provided at the upper end thereof with a rotation prevention groove 59c in which the first rod 36 is engaged. Movement of the lower slidable cylinder 53, which is supported by the guide bar 58, together with the guide bar 58 and the third lens group frame 47 in the leftward/rightward direction causes the second light shield frame 59 to slide on and along the first rod 36 in the leftward/rightward direction.

Among the above described components, the pair of limit projections 26, the second rod 37, the second lens group frame 39, the guide bar 52, the upper slidable cylinder 53 and the compression coil spring S1 are components of a light-shield-frame position adjustment mechanism for the first light shield frame 54. In addition, the pair of limit projections 26, the first rod 36, the third lens group frame 47, the lower slidable cylinder 53, the guide bar 58 and the compression coil spring S2 are components of a light-shield-frame position adjustment mechanism for the second light shield frame 59.

The board module 65 is provided with a circuit board 66. The circuit board 66 has substantially the same front shape as that shape of the accommodating recess 18 and is configured from a flat plate orthogonal to the forward/rearward direction. The circuit board 66 is provided on the rear surface thereof with a printed circuit (not shown), and two circular holes 67 are formed through two diagonally opposite corners of the circuit board 66, respectively.

The board module 65 is provided with an image sensor (image pickup device) 69 (see FIGS. 1 and 5) which is fixed at the right end of the rear surface of the circuit board 66. A plurality of terminals (not shown) of the image sensor 69 are fixedly connected to the aforementioned printed circuit by soldering. The image sensor 69 is provided on the rear thereof with an imaging surface (not shown) orthogonal to the forward/rearward direction. In addition, the image sensor 69 is provided, on the incident surface (the rear surface in the drawings), with a cover glass 70 which is made of a flat glass plate and fixedly installed so as to cover the entire imaging surface of the image sensor 69.

A rear surface (rear end) of the image sensor 69 is covered with a packing (fixer) 72 made of an elastic material such as rubber which is open at the front and left sides. The packing 72 is provided with an exposing hole (through-hole) 73 through which the entire imaging surface of the image sensor 69 is rearwardly exposed, and is further provided on the right-hand side of the exposing hole 73, with a through-hole 74.

The circuit board 66, the image sensor 69 and the packing 72 that have been described above are components of the board module 65.

The cover (casing) 76 is a press-molded sheet metal product and is integrally provided with a base 77, two (upper and lower) short engaging lugs 78, two (upper and lower) long engaging lugs (resilient engaging lug) 79 and a pair of (upper and lower) side engaging lugs (resilient engaging lugs) 81. The base 77 is formed as a planar member orthogonal to the forward/rearward direction. The upper short engaging lug 78 and the upper long engaging lug 79 extend rearward from the upper edge of the base 77, and the lower short engaging lug 78 and the lower long engaging lug 79 extend rearward from the lower edge of the base 77. The pair of side engaging lugs 81 extend rearward from the right edge of the base 77. Each side engaging lug 81 is in shape of a letter T as viewed from a side thereof. The base 77 is slightly greater in size (dimensions) than the circuit board 66 and has a substantially rectangular shape with a size capable of closing the front opening (defined by the accommodating recess 18) of the housing 16 (this size is substantially the same as or greater than the front opening of the housing 16). The base 77 is provided with three pressure leaves 84, 85 and 86 each of which is resiliently deformable in the forward/rearward direction.

The pressure leaves 84, 85 and 86 are provided with pressure projections 84a, 85a and 86a, respectively, which project rearwardly (portions of the front surfaces of the pressure leaves 84, 85 and 86 which respectively correspond to the pressure projections 84a, 85a and 86a are dent (recessed) rearward). The pressure leaves 84, 85 and 86 in a free state lie in a plane in which the other part of the base 77 lies.

An engaging hole 80 and an engaging hole 82 are formed through each long engaging lug 79 and each side engaging lug 81, respectively.

To install the board module 65 and the cover 76 to the body module 15, firstly the front opening of the accommodating recess 18 is closed by the circuit board 66 so that the outer edge of the rear surface of the circuit board 66 comes into surface contact with the board support surface 27 while the two circular holes 67 of the circuit board 66 are brought into engagement with the two lock projections 28 (thereupon, the front surface of the circuit board 66 and the front surface of the housing 16 substantially lie in a common plane). Thereupon, as shown in FIG. 5, the three positioning projections 23 of the housing 16 forwardly pass through the exposing hole 73 and the through-hole 74 of the packing 72 so that the flat positioning surfaces 24 of the three positioning projections 23 come in surface contact with a flat rear surface of the cover glass 70 (at the outer periphery of a rear surface portion immediately behind the imaging surface of the image sensor 69). In addition, the imaging surface of the image sensor 69 faces the exit surface LP2-$b$ of the second prism LP2 in the forward/rearward direction through the exposing hole 73. Additionally, a rear surface of the packing 72 comes in contact with the front surface of the positioning portion 22.

Subsequently, the base 77 fully covers, from the front, a portion of the front of the housing 16 from the partition wall 19 rightward to fix the cover 76 to the housing 16 by respectively engaging the upper and lower short engaging lugs 78 with the first engaging recesses 30, respectively engaging the upper and lower engaging holes 80 of the upper and lower long engaging lugs 79 with the upper and lower engaging projections 32, and respectively engaging the engaging holes 82 of the upper and lower side engaging lugs 81 with the upper and lower engaging projections 34.

Upon the imaging unit 10 being assembled in the above described manner, the circuit board 66 and the image sensor 69 are pressed rearward due to the pressure projections 84a, 85a and 86a of the pressure leaves 84, 85 and 86 coming in contact with a right-hand side portion of the front surface of the circuit board 66 so that a pressing force (biasing force) in the rearward direction acts on the front side of the circuit board 66 from the pressure leaves 84, 85 and 86 (via the pressure projections 84a, 85a and 86a) that are slightly resiliently deformed forwardly. Thereupon, an integral combination of the circuit board 66 and the image sensor 69 is held from the front and the rear sides thereof between the flat positioning surfaces 24 of the three positioning projections 23 and the pressure projections 84a, 85a and 86a of the cover 76, and accordingly, the circuit board 66 and the image sensor 69 are precisely positioned with respect to the housing 16 and the second prism LP2 in the forward/rearward direction by the three positioning projections 23 of the housing 16 and the pressure projections 84a, 85a and 86a of the cover 76.

Since the cover 76 is made of metal, each of the base 77 and the pressure leaves 84, 85 and 86 exhibits an appropriate mechanical strength even if the thickness of the cover 76 is small. Therefore, even if an external force is exerted on the imaging unit 10 or vibrations occur in the imaging unit 10 when it is attempted to reduce the thickness of the entire imaging unit 10 by reducing the thickness the circuit board 66 and the cover 76, the position of the image sensor 69 (the imaging surface thereof) in the forward/rearward direction is held at a predetermined design position.

Moreover, the positioning of the image sensor 69 with respect to the housing 16 and the second prism LP2 does not cause an increase in the number of components because such positioning is carried out using the cover 76.

If the imaging unit 10 is directed toward an object located in front of the imaging unit 10, light reflected by the object (light emanating from a photographic object) enters the first prism LP1 through the incident surface LP1-a after passing through the lens L1 and is reflected at an angle of 90 degrees by an inner surface of the first prism LP1 to travel toward the exit surface LP-1b. Subsequently, the reflected light that emerges from the exit surface LP1-b enters the second prism LP2 from the incident surface LP2-a after passing through the lenses L2 through L6, the light-bundle limiting aperture 54a of the first light shield frame 54 and the light-bundle limiting aperture 59a of the second light shield frame 59, and is reflected at an angle of 90 degrees by an inner surface of the second prism LP2 to travel toward the exit surface LP-2b. Subsequently, the reflected light that emerges from the exit surface LP2-b is captured (received) by the aforementioned imaging surface of the image sensor 69 after passing through the exposing hole 73 and the cover glass 70.

Even if an external force is exerted on the imaging unit 10 or vibrations occur in the imaging unit 10 as described above, the position of the image sensor 69 (the imaging surface thereof) in the forward/rearward direction is held at a predetermined design position with precision, and accordingly, a sharp object image with no blur can be captured by the image sensor 69 even if an external force is exerted on the imaging unit 10 or vibrations occur in the imaging unit 10 as described above.

Additionally, if the above described imaging optical system is driven to perform a zooming operation and a focusing operation by moving the second lens group LG2 (the lenses L4 and L5) and the third lens group LG3 (the lens L6) along the first rod 36 and the second rod 37 with the first motor M1 and the second motor M2, an image capturing operation in a state where the imaging optical system is zoomed and focused on a photographic object image becomes possible.

The distance between the third lens group frame 47 and the second light shield frame 59 in the leftward/rightward direction is constant (invariant) when the third lens group frame 47 (the third lens group LG3) moves in a third-lens-group integral-movement range (first moving range) which corresponds to the range of movement of the third lens group frame 47 (the third lens group LG3) between the telephoto extremity position and a near-telephoto-extremity position (not shown) located in the vicinity of the telephoto extremity position. However, when the third lens group frame 47 moves toward the wide-angle extremity position in a third-lens-group relative-movement range (second moving range) which is positioned closer to the wide-angle extremity position than the aforementioned near-telephoto-extremity position, the second light shield frame 59 is prevented from moving further rightward by engagement of the light shield frame position limit surfaces 26a of the pair of limit projections 26 with a right side surface of the second light shield frame 59, while the third lens group frame 47 moves further rightward, which causes the distance between the second light shield frame 59 and the third lens group frame 47 (the third lens group LG3) in the leftward/rightward direction to decrease gradually and eventually become a minimum distance upon the third lens group frame 47 reaching the wide-angle extremity position (see FIG. 6). On the other hand, when the second lens group frame 39 moves in a second-lens-group integral-movement range which corresponds to the range of movement of the second lens group frame 39 between the telephoto extremity position and a near-wide-extremity position located in the vicinity of the wide-angle extremity position, the distance between the second lens group frame 39 and the first light shield frame 54 in the leftward/rightward direction is constant (invariant). However, when the second lens group frame 39 moves toward the wide-angle extremity position in a second-lens-group relative-movement range which is positioned closer to the wide-angle extremity than the aforementioned near-wide-extremity position, the first light shield frame 54 is prevented from moving further rightward by engagement of a right side surface of the first shield frame 54 with a left side surface of the second light shield frame 59 (which is prevented from moving by the pair of limit projections 26), while the second lens group frame 39 moves further rightward, which causes the distance between the first light shield frame 54 and the second lens group frame 39 (the second lens group LG2) in the leftward/rightward direction to decrease gradually and eventually become a minimum distance upon the second lens group frame 39 reaching the wide-angle extremity position (see FIG. 6).

If an optical element such as the lens L5 or the lens L6 has a manufacturing error (e.g., a focal length error), it is sometimes the case that, when each of the second lens group frame 39 and the third lens group frame 47 is moved in between the telephoto extremity position and the wide-angle extremity position, the AF operating range of the third lens group frame 47 slightly deviates (shifts) rightward from a predetermined design position, which causes the third lens group frame 47 to come into contact with the first light shield frame 54 and subsequently move the first light shield frame 54 slightly rightward to thereby expand the compression coil spring S1 slightly from its free state, thus causing the distance between the second lens group frame 39 and the first light shield frame 54 to increase slightly.

In the case where the imaging unit 10 is miniaturized (slimmed down) by configuring the imaging optical system using two prisms (the first prism LP1 and the second prism LP2) in a manner described in the above embodiment, the distance between the imaging optical system and an inner wall of the housing 16 or an inner surface (rear surface) of the circuit board 66 becomes small, and accordingly, light (stray light) reflected by the inner wall of the housing 16 or the inner surface (rear surface) of the circuit board 66 may be directly incident on the imaging surface of the image sensor 69 rather than via the second prism LP2, while this reflected light may be reflected by a side of the second prism LP2 or the exit surface LP2-b to be incident on the imaging surface of the image sensor 69, which consequently increases the possibility of a ghost image occurring in the captured image unless some sort of countermeasure is taken.

However, in the above described embodiment of the imaging unit, the light-shield-frame position adjustment mechanism for the first light shield frame 54 and the light-shield-frame position adjustment mechanism for the second light shield frame 59 maintain a constant (invariant) distance between the second lens group frame 39 and the first light shield frame 54 in the leftward/rightward direction and a constant (invariant) distance between the third lens group frame 47 and the second light shield frame 59 in the leftward/rightward direction when the second lens group frame 39 (the lenses L4 and L5) and the third lens group frame 47 (the third lens group LG3) move in the second-lens-group integral-movement range and the third-lens-group integral-movement range, respectively, while the light-shield-frame position adjustment mechanism for the first light shield frame 54 and the light-shield-frame position adjustment mechanism for the second light shield frame 59 gradually vary (decrease) the distance between the second lens group frame 39 and the first light shield frame 54 and the distance between the third lens group frame 47 and the second light shield frame 59 when the second lens group frame 39 and the third lens group frame 47 move in the second-lens-group relative-movement range and the third-lens-group relative-movement range to thereby locate the first light shield frame 54 at an optimum position for shielding stray light and locate the second light shield frame 59 at an optimum position for shielding stray light, respectively, regardless of the focal length at which the imaging optical system may be set. Accordingly, it is possible to effectively prevent ghost images from occurring.

In addition, the distance between the second lens group frame 39 and the first light shield frame 54 in the leftward/rightward direction and the distance between the third lens group frame 47 and the second light shield frame 59 in the leftward/rightward direction gradually decrease when the second lens group frame 39 and the third lens group frame move within the aforementioned second-lens-group relative-movement range and the aforementioned third-lens-group relative-movement range, respectively, which enables the second lens group frame 39 (the second lens group LG2), the third lens group frame 47 (the third lens group LG3), the first light shield frame 54 and the second light shield frame 59 to slidingly move in a wide range with no need to increase the size of the imaging unit 10 in the leftward/rightward direction.

Moreover, since the first light shield frame 54 is supported by the guide bar 52 (which is fixed to the second lens group frame 39) and the second rod 37 (which guides the second lens group frame 39 and the third lens group frame 47 in the leftward/rightward direction) and since the second light shield frame 59 is supported by the guide bar 58 (which is fixed to the third lens group frame 47) and the first rod 36 (which guides the second lens group frame 39 and the third lens group frame 47 in the leftward/rightward direction), no special holding frame is required for either the first light shield frame 54 or the second light shield frame 59, and the movement supporting mechanism for the first light shield frame 54 and the second light shield frame 59 is simple in structure.

Furthermore, as each mechanism for varying the distance between the second lens group frame 39 and the first light shield frame 54 in the leftward/rightward direction and the distance between the third lens group frame 47 and the second light shield frame 59 in the leftward/rightward direction adopts a simple configuration using the pair of limit projections 26, the structure of each of these mechanisms is simple.

Figure 9:
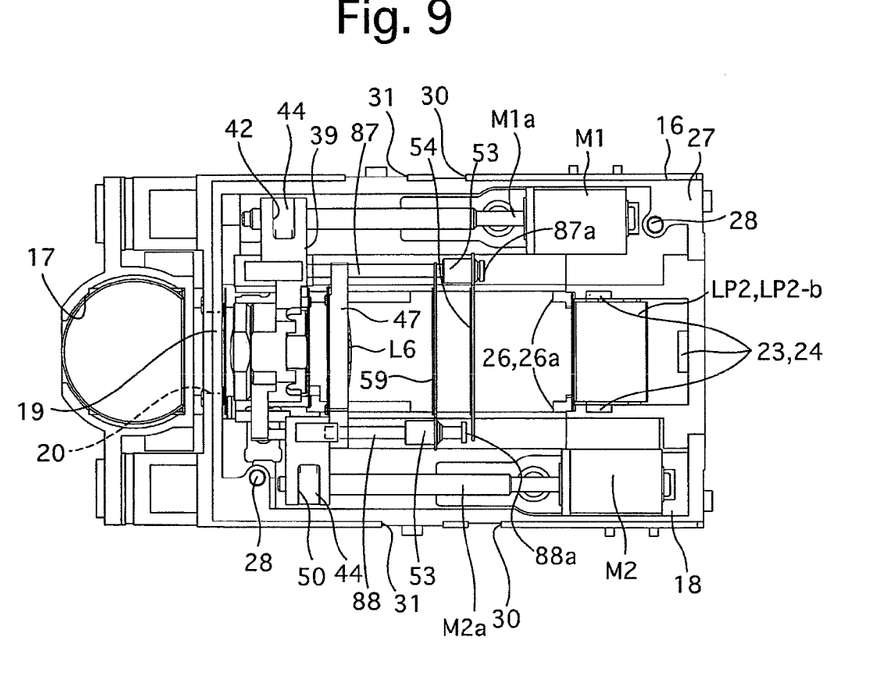
FIG. 9 is a front elevational view of the imaging unit with the cover, the circuit board, a first rod, a second rod and a packing removed when the imaging optical system in a modified embodiment of the imaging unit is set at the telephoto extremity.
Figure 10:
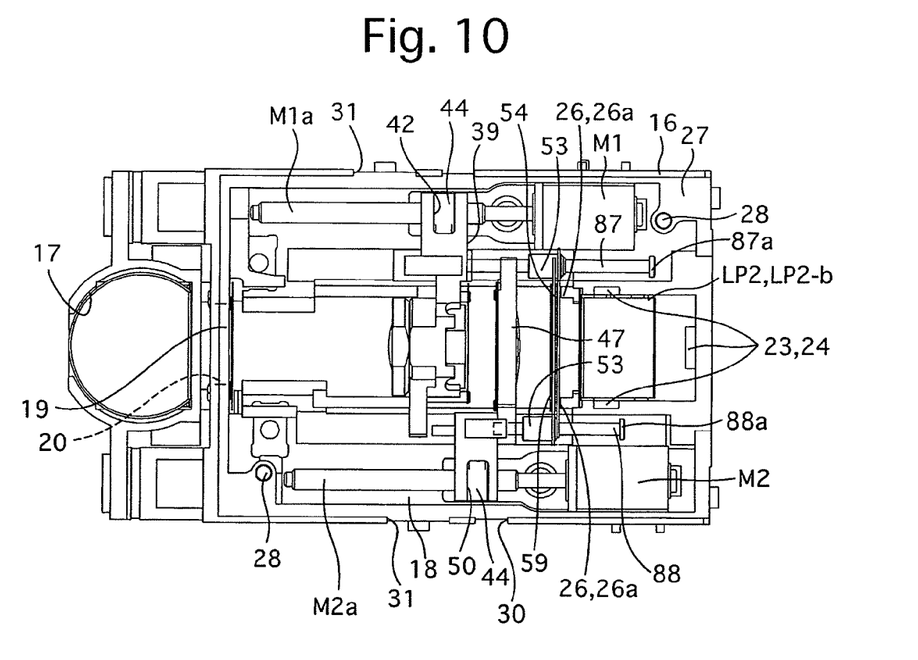
FIG. 10 is a view similar to that of FIG. 8 when the imaging optical system in the modified embodiment of the imaging unit shown in FIG. 9 is set at the wide-angle extremity.

Although the present invention has been described based on the above illustrated embodiment, making various modifications to the above illustrated embodiment is possible. For instance, the adoption of modifications as shown in FIGS. 9 and 10 is possible. Specifically, in the embodiment shown in FIGS. 9 and 10, a guide bar 87 that corresponds to the guide bar 52 is fixed to the second lens group frame 39 (a stopper 87a identical in specifications to the stopper 52a is integrally formed with the right end of the guide bar 87), while a guide bar 88 that corresponds to the guide bar 58 is fixed to the third lens group frame 47 (a stopper 88a identical in specifications to the stopper 58a is integrally formed with the right end of the guide bar 87). The guide 87 is formed to be greater in length than the guide bar 88, the first light shield frame 54 (the rotation prevention groove 54c thereof being engaged with the second rod 37 to be freely slidable thereon) is fixed to the slidable cylinder 53 which is supported by the guide bar 87 to be freely slidable thereon, and the second light shield frame 59 (the rotation prevention groove 59c thereof being engaged with the first rod 36 to be freely slidable thereon) is fixed to the slidable cylinder 53 which is supported by the guide bar 88 to be freely slidable thereon.

In addition, the guide bar 52, the first light shield frame 54 (the associated slidable cylinder 53) and the compression coil spring S1 can be omitted, or the guide bar 58, the second light shield frame 59 (the associated slidable cylinder 53) and the compression coil spring S2 can be omitted.

Figure 11:
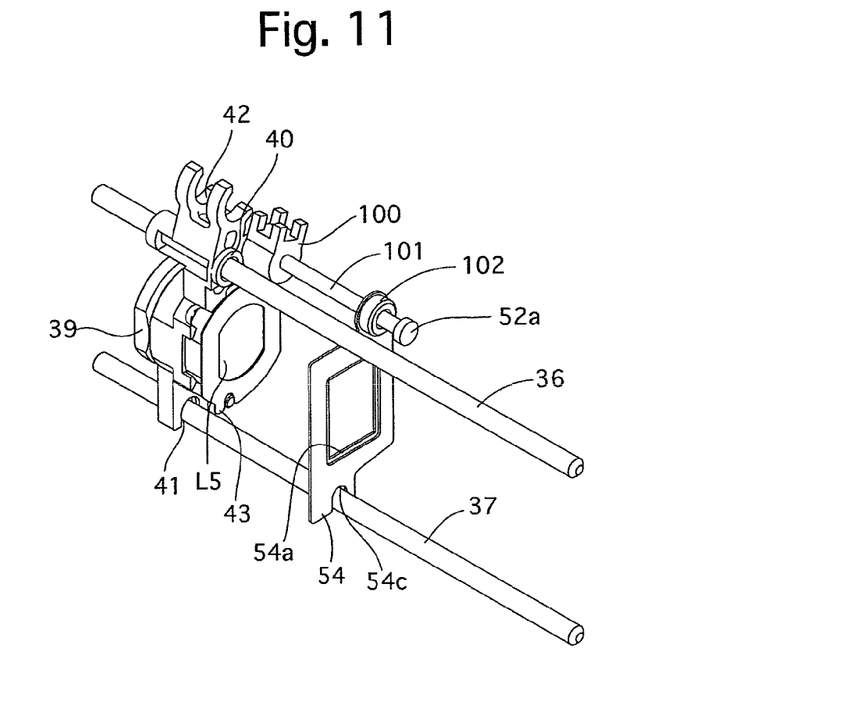
FIG. 11 is a view similar to that of FIG. 7, showing a second lens group frame, a first light shield frame and peripheral parts in another modified embodiment of the imaging unit.
Figure 12:
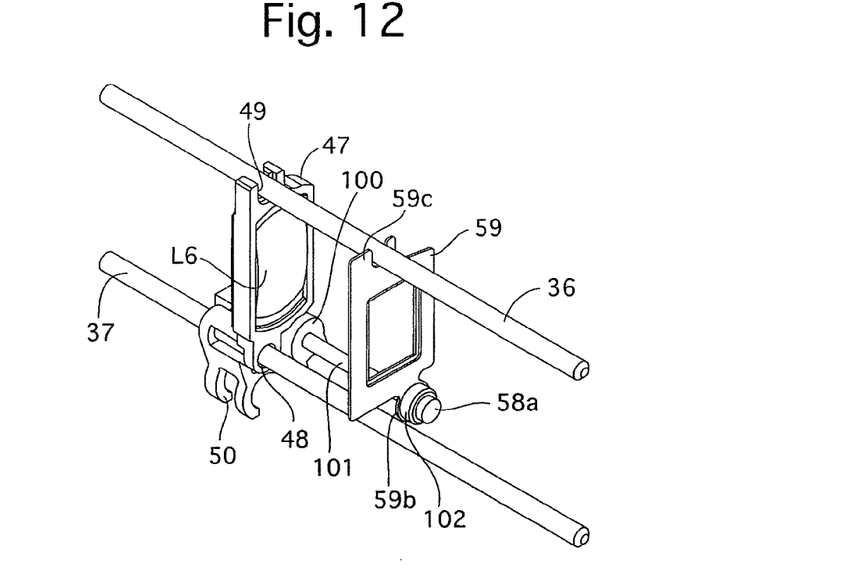
FIG. 12 is a view similar to that of FIG. 8, showing a third lens group frame, a second light shield frame and peripheral parts in the modified embodiment shown in FIG. 11.

In addition, the light-shield-frame position adjustment mechanism for the first light shield frame 54 and the light-shield-frame position adjustment mechanism for the second light shield frame 59 can each be modified as shown in FIGS. 11 and 12, respectively. In this modified embodiment, two stepping motors 100, which are independent of each other, are fixed to the second lens group frame 39 and the third lens group frame 47, respectively. Each stepping motor 100 is equipped with a screw shaft (guide bar) 101 which rotates about the axis thereof and extends parallel to the first rod 36 and the second rod 37. A stopper 52a is fixed to the end of the screw shaft 101 of the stepping motor 100 for the second lens group frame 39, while a stopper 58a is fixed to the end of the screw shaft 101 of the stepping motor 100 for the third lens group frame 47. A nut 102 is screw-engaged with each screw shaft 101, and the first light shield frame 54 and the second light shield frame 59 are fixed to the nuts 102 that are screw-engaged with the screw shaft 101 of the stepping motor 100 for the second lens group frame 39 and the screw shaft 101 of the stepping motor 100 for the third lens group frame 47, respectively. Accordingly, rotating the stepping motor 100 for the second lens group frame 39 causes the distance between the second lens group frame 39 and the first light shield frame 54 in the leftward/rightward direction to vary, and rotating the stepping motor 100 for the third lens group frame 47 causes the distance between the third lens group frame 47 and the second light shield frame 59 in the leftward/rightward direction to vary.

Figure 13:
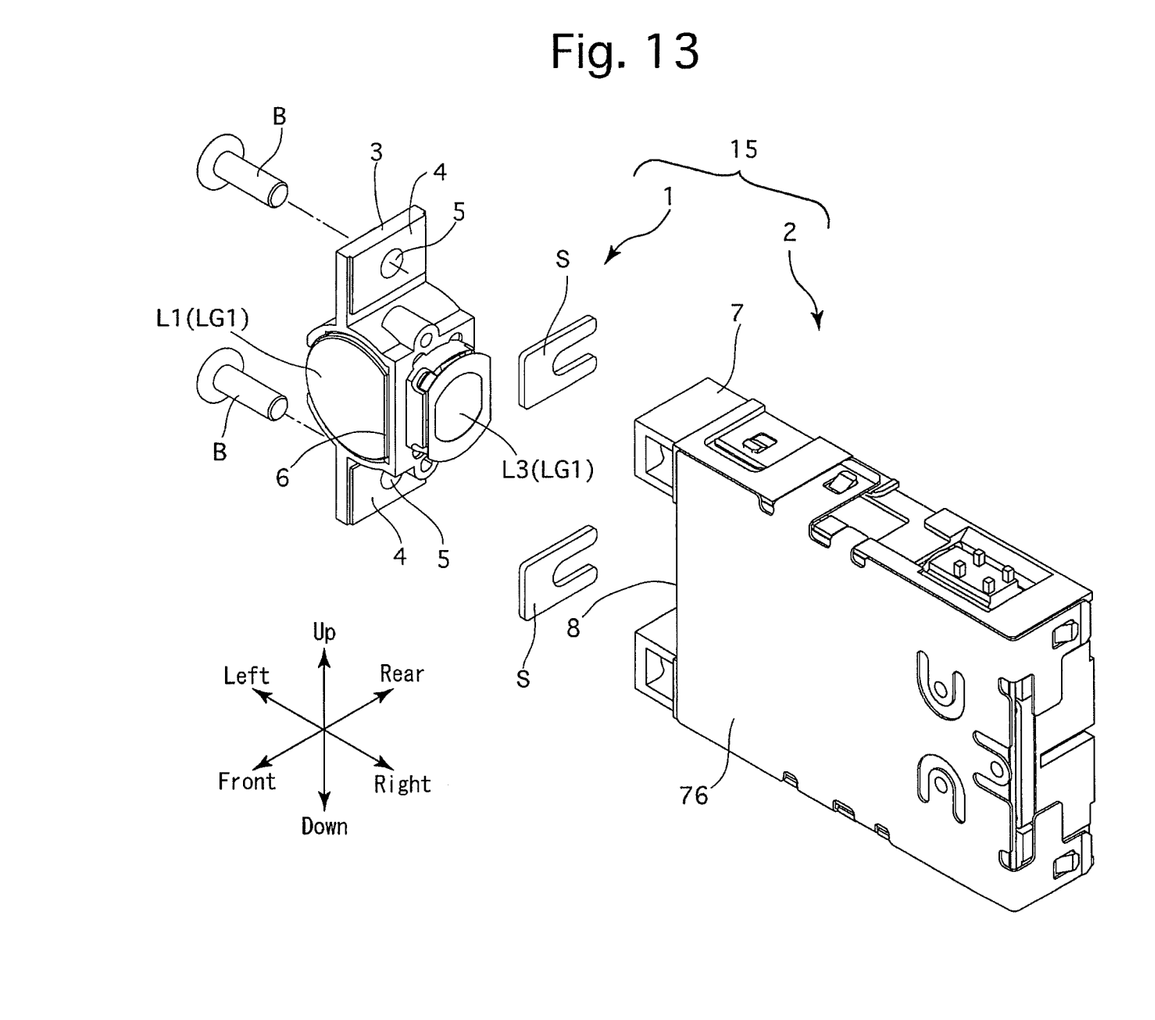
FIG. 13 is an exploded perspective view of another modified embodiment of the imaging unit.

Additionally, as shown in FIG. 13, it is possible for the body module 15 to be configured of a first lens group unit 1 and a body unit 2 that are independent of each other and for the housing (which corresponds to the housing 16) of the body module 15 to be configured of two components (a holder 3 and a main housing 7).

The first lens group unit 1 is provided with a holder 3 formed as a synthetic-resin molded product. The holder 3 is provided at the left end thereof with a pair of (upper and lower) lugs 4, each of which has a through-hole 5. A prism accommodating space which is open at the front and right sides is formed in the holder 3. The holder 3 is provided at the front opening of the prism accommodating space with a front lens holding hole 6 which is open at the front and at a left portion thereof, and is provided at the right opening of the prism accommodating space with a right lens holding hole. The first prism LP1 is fitted into the prism accommodating hole to be fixed therein, and the lens L1 is fitted into the front lens holding hole 6 to be fixed therein. In addition, the lenses L2 and L3 are fitted into the right lens holding hole to be fixed therein.

The main housing 7 of the body unit 2 is identical in structure to the housing 16 from which a left end portion thereof (which corresponds to the holder 3) is removed, and is provided at the left end of the main housing 7 with an installation recess 8. In addition, the same components as those installed in the accommodating recess 18 of the housing 16 are installed in the accommodating recess 18 of the main housing 7, and the front of the main housing 7 is covered with the cover 76.

The first lens group unit 1 and the body unit 2 are fixed together as one unit by inserting from the left side a pair of set screws B into the upper and lower through-holes 5 of the holder 3 and screwing the male thread portions of the pair of set screws B into a pair of female screw holes (not shown) formed in upper and lower left end surfaces of the main housing 7 with a portion of the holder 3 which is positioned on the right-hand side of the pair of lugs 4 being fitted into the installation recess 8 and with a pair of (upper and lower) spacers S held between the upper and lower lugs 4 of the holder 3 and the upper and lower left end surfaces of the main housing 7 (that are the left end surfaces of a pair of projections of the main housing 7 which are formed on the vertically opposite sides of the installation recess 8).

Upon the first lens group unit 1 and the body unit 2 being fixed together as one unit, the right end of the holder 3 (in which the right lens holding hole is formed) is fitted into the communication hole 20 (not shown in FIG. 13) of the partition wall 19 of the main housing 7, and the optical axis A of the lenses L2 and L3 coincides with the optical axis of the second lens group LG2 and the third lens group LG3.

Additionally, the imaging unit according to the present invention can be provided with three or more movable lens groups (together with three or more associated support frames) and each movable lens group can be provided with a light-shield-frame position adjustment mechanism and a light shied frame.

Additionally, each of the first prism LP1 and the second prism LP2 can be replaced by a mirror.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging unit comprising:
    an incident-side reflecting surface which is provided in a casing and reflects light, emanating from an object and entering said casing from the outside thereof in a direction of thickness of said casing, so that said light reflected by said incident-side reflecting surface travels along a lengthwise direction of said casing that is orthogonal to said direction of thickness of said casing;
    a movable lens group which is provided in said casing as a power-varying lens group and allows said light, which is reflected by said incident-side reflecting surface, to pass through said movable lens group, said movable lens group being movable along said lengthwise direction of said casing;
    an exit-side reflecting surface which is provided in said casing and reflects said light, which is incident on said exit-side reflecting surface after passing through said movable lens group, so that said light travels from said exit-side reflecting surface and in said direction of thickness of said casing;
    an image sensor which is provided in said casing and receives said light that has traveled from said exit-side reflecting surface;
    a light shield frame provided in said casing between said movable lens group and said exit-side reflecting surface; and
    a light-shield-frame position adjustment mechanism which is provided in said casing, maintains a constant distance between said movable lens group an said light shield frame when said movable lens group moves in a first moving range, and varies the distance between said movable lens group and said light shield frame when said movable lens group moves in a second moving range, said light-shield-frame position adjustment mechanism comprising
    a rod which is fixed to said casing and positioned therein, extends in said lengthwise direction of said casing;
    a movable lens frame which supports said movable lens group and is supported by said rod to be slidable thereon; and
    a guide bar which is fixed to said movable lens frame to extend parallel to said rod and supports said light shield frame in a manner to allow said ht shield frame to move on said guide bar in a direction of an axis of said guide bar.

2. The imaging unit according to claim 1, wherein said rod is configured to prevent said light shield frame from rotating.

3. The imaging unit according to claim 2, wherein said light-shield-frame position adjustment mechanism comprises:
    a stopper which is provided on said guide bar on an opposite side of said light shield frame with respect to said movable lens frame, said stopper comes into contact with said light shield frame to prevent said light shield frame from moving further in a direction away from said movable lens frame when said light shield frame moves from said movable lens frame side; and
    a biaser which provides a biasing force so as to move said light shield frame toward said stopper.

4. The imaging unit according to claim 1, wherein said light-shield-frame position adjustment mechanism comprises a light shield frame position limit portion provided in said casing, and
    wherein, when said movable lens group moves in one direction in said second moving range, said light shield frame position limit portion comes into contact with said light shield frame to prevent said light shield frame from moving further in said one direction relative to said guide bar.

5. The imaging unit according to claim 2, wherein, when said movable lens group moves in one direction in said second moving range, said light-shield-frame position adjustment mechanism prevents said light shield frame from moving further in said one direction relative to said guide bar beyond a predetermined point while allowing said movable lens group to continue moving in said one direction by a predetermined amount of movement so as to reduce said distance between said movable lens group and said light shield frame.

6. The imaging unit according to claim 3, wherein said biaser comprises a spring.

7. The imaging unit according to claim 1, wherein said guide bar and said movable lens frame are fixed relative to each other.

8. An imaging unit comprising:
    an incident-side reflecting surface which is provided in a casing and reflects light, emanating from an object and entering said casing from the outside thereof in a direction of thickness of said casing, so that said light reflected by said incident-side reflecting surface travels along a lengthwise direction of said casing that is orthogonal to said direction of thickness of said casing;
    a movable lens group which is provided in said casing as a power-varying lens group and allows said light, which is reflected by said incident-side reflecting surface, to pass through said movable lens group, said movable lens group being movable along said lengthwise direction of said casing;

an exit-side reflecting surface which is provided in said casing and reflects said light, which is incident on said exit-side reflecting surface after passing through said movable lens group, so that said light travels from said exit-side reflecting surface and in said direction of thickness of said casing;

an image sensor which is provided in said casing and receives said light that has traveled from said exit-side reflecting surface;

a light shield frame provided in said casing between said movable lens group and said exit-side reflecting surface; and a light-shield-frame position adjustment mechanism which is provided in said casing, maintains a constant distance between said movable lens group an said light shield frame when said movable lens group moves in a first moving range, and varies the distance between said movable lens group and said light shield frame when said movable lens group moves in a second moving range, said light-shield-frame position adjustment mechanism comprising:

a rod which is fixed to said casing and positioned therein, extends in said lengthwise direction of said casing and prevents said light shield frame from rotating;

a movable lens frame which supports said movable lens group and is supported by said rod to be slidable thereon; and a guide bar which is fixed to said movable lens frame to extend parallel to said rod and supports said light shield frame in a manner to allow said light shield frame to move on said guide bar in a direction of an axis of said guide bar, wherein when said movable lens group moves in one direction in said second moving range, said light-shield-frame position adjustment mechanism prevents said light shield frame from moving further in said one direction relative to said guide bar beyond a predetermined point while allowing said movable lens group to continue moving in said one direction by a predetermined amount of movement so as to reduce said distance between said movable lens group and said light shield frame.

* * * * *